United States Patent [19]

Kraus

[11] Patent Number: 4,587,866
[45] Date of Patent: May 13, 1986

[54] CONSTANT SPEED DRIVE SYSTEM AND PLANETARY GEAR DRIVE THEREFOR

[75] Inventor: James H. Kraus, Huntington Beach, Calif.

[73] Assignee: The Garrett Corporation, Los Angeles, Calif.

[21] Appl. No.: 303,950

[22] Filed: Sep. 21, 1981

[51] Int. Cl.⁴ .................. F16H 37/06; F16H 15/08; F16H 3/74; F16H 1/28

[52] U.S. Cl. ........................................ 74/691; 74/690; 74/200; 74/190.5; 74/752 A; 74/681; 74/802

[58] Field of Search ............. 74/691, 690, 681, 200, 74/201, 208, 190.5, 752 C, 752 A, 750 R, 751, 802, 675, 705, 710, 687, 793

[56] References Cited

U.S. PATENT DOCUMENTS

| | | | |
|---|---|---|---|
| 2,086,491 | 7/1937 | Dodge | 74/691 |
| 2,581,320 | 1/1952 | Burton et al. | 170/135.2 |
| 2,716,357 | 8/1955 | Rennerfelt | 74/691 |
| 2,823,558 | 2/1958 | Semar et al. | 74/665 |
| 3,127,791 | 4/1964 | Roe | 74/675 |
| 3,151,502 | 10/1964 | Kron et al. | 74/665 |
| 3,277,745 | 10/1966 | Harned et al. | 74/691 |
| 3,298,251 | 12/1963 | Moss | 74/867 |
| 3,307,426 | 3/1967 | Whitaker | 74/675 |
| 3,406,597 | 10/1968 | Perry et al. | 74/691 X |
| 3,479,909 | 11/1969 | Fritsch | 74/714 |
| 3,507,113 | 4/1970 | Herrmann et al. | 60/39.16 |
| 3,540,311 | 11/1969 | Chillson | 74/797 |
| 3,570,317 | 3/1971 | Kraus | 74/200 |
| 3,684,065 | 8/1972 | Scheiter | 74/691 X |
| 3,861,484 | 1/1975 | Joslin | 74/675 |
| 3,864,987 | 2/1975 | Vigneri | 74/665 B |
| 3,971,266 | 7/1976 | Inakura et al. | 74/675 |
| 4,086,820 | 5/1978 | Kraus et al. | 74/200 |
| 4,132,131 | 1/1979 | DeBruyne | 74/675 |
| 4,297,918 | 11/1981 | Perry | 74/201 |

FOREIGN PATENT DOCUMENTS 1021198 6/1950 France .................... 74/691

Primary Examiner—William F. Pate, III
Assistant Examiner—Stephen Andrews
Attorney, Agent, or Firm—Henry M. Bissell; Albert J. Miller; James W. McFarland

[57] ABSTRACT

A planetary gear transmission having the capability of accepting input power from two separate, counter-rotating shafts, and combining the input power with application to a single output shaft. The two input shafts are coaxial and each is coupled to its own input sun gear. The output shaft extends from the side of the transmission opposite to the input shafts and is coaxial therewith. Various series of planetary gears mounted on a planet carrier provide the coupling between the input and output sun gears. There is no ring gear, and the carrier is not independently driven.

The planetary gear transmission is combined with a continuously variable transmission and a direct drive coupled in split power paths from a single drive shaft to provide constant speed output over a range of 2:1 variation in speed of the drive shaft.

32 Claims, 4 Drawing Figures

CONSTANT SPEED DRIVE SYSTEM AND PLANETARY GEAR DRIVE THEREFOR

BACKGROUND OF THE INVENTION

1. Field of the Invention

This invention relates to a power transmission system and, more particularly, to a planetary gear transmission having dual input shafts which are summed to develop the output power and maintain constant speed output for variable speed inputs.

2. Description of the Prior Art

Planetary gear systems, sometimes referred to as differentials, are commonly used to accomplish combination or division of power flow between input and output drive shafts. A basic differential gear system consists of a central sun gear, a plurality of planet gears mounted on planet arms (the carrier) and rotating around the sun gear, and a ring gear surrounding all the other gears and engaging the planets. In such an arrangement, input and output drive shafts, usually coaxial and some of which may be concentric, are coupled respectively to the sun gear, the planetary gear carrier, and the ring gear. In such a system, power may be transmitted through the differential transmission in six different ways, each arrangement producing distinct speed and torque relationships among the three separate shafts. However, power ratios among the respective shafts are uniquely the same for all arrangements.

A common application of a differential gear assembly is the conventional rear axle gear unit in an automotive vehicle. This allows the drive shaft to turn the drive wheels at different speeds when the vehicle is going around a curve. In such an arrangement, the ring gear is coupled to the planetary gear carrier with two sun gears coupled to the respective sections of the split rear axle.

More complex and specialized planetary gearing systems have been developed for various special applications. For example, the Burton et al U.S. Pat. No. 2,581,320 discloses a gearing system to couple two engines to two counter-rotating propellers in an aircraft. Other systems coupling multiple power inputs to a common output are disclosed in U.S. Pat. Nos. 2,823,558 of Semar et al, 3,507,113 of Herrmann et al, 3,861,484 of Joslin, 3,127,791 of Roe, 3,151,502 of Kron et al and 3,971,266 of Inakura et al. In the arrangements of Roe and of Inakura et al, each input shaft is enabled to transmit power independently to the output.

So called free-floating planetary transmissions are the subject of U.S. Pat. Nos. 4,132,131 of DeBruyne and 3,540,311 of Chillson, the former disclosing, like Burton et al, an arrangement to drive counter-rotating output shafts from a plurality of inputs.

The arrangement of U.S. Pat. No. 3,479,909 of Fritsch includes multiple power paths from a single power source to a single gear output, as does the arrangement of U.S. Pat. No. 3,864,987 of Vigneri.

U.S. Pat. No. 3,307,426 of Whitaker discloses a complex transmission arrangement for coupling to a reversible turbine engine for starting an aircraft engine with various takeoffs for operating accessories. This system incorporates a constant speed drive for controlling the accessory at constant speed over variations in the engine speed range.

In a particular application to which the present invention is directed, it is desired to drive an aircraft generator at a constant speed of 12000 RPM to develop 400 hertz power at 75 kw capacity from a turbine having a nominal 2/1 variation in operating speed. Conventional design approaches to solving this problem utilize a split power path in which one of the paths includes a hydraulically controlled, continuously variable transmission (CVT) for providing speed control. Utilizing a split power path in this manner reduces the power requirements imposed on the CVT. However, such an arrangement when used in combination with a mechanical traction CVT and a conventional planetary gear transmission results in unacceptably high rotational speeds for the planet carrier and planetary gears. Accordingly, some arrangement is needed which is capable of combining the split power paths, driven at varying rates of speed and in reverse directions to each other, to develop a constant output speed. The input power over the two separate input paths is summed together over the speed ranges encountered without excessive planet gear and carrier speeds.

SUMMARY OF THE INVENTION

One particular arrangement of a planetary gear transmission in accordance with the present invention comprises a planetary gear assembly on which are mounted three sets of planetary gears for rotation about a central axis. Three corresponding sun gears are mounted for rotation about this axis. Two of these sun gears, designated the first and second input sun gears, are mounted on concentric shafts and are driven to rotate in opposite directions with respect to each other. The third sun gear is coupled to an output shaft which extends from the opposite side of the transmission from the power input side. First and second planetary gear sets, coupled respectively to the first and second input sun gears, are also in mesh with each other. The input portion of the transmission forms a summing junction for the two power paths of a power split transmission. As the relative speeds of the input sun gears change with respect to each other, the relative speeds of the intermeshed planetary gears also attempt to change. However, these planet gears, by being in mesh, must maintain a fixed speed ratio with respect to each other, and therefore combine to drive the planet carrier. The relative speeds of the input sun gears, in combination with the diameter ratios of the respective input sun gears to their corresponding intermeshed planetary gear sets, determine both the speed and rotational direction of the planet carrier.

The output sun gear is in mesh with and is driven by the third, or output, planetary gear set. The planet gears of the third set are also in mesh with the planet gears of the second planetary set, coupled to the second input sun gear. Output power to the output sun gear is therefore the sum of the power from the second input planetary gear set, driving the output sun gear through the third planetary gear set while reacting against the carrier, plus the power from the rotating carrier assembly driving the output sun gear through the output planetary gear system while reacting against the input sun gears through the interlocking input planetary gear sets.

In one particular arrangement in accordance with the invention, relative diameters of the three sets of sun gears and planetary gear sets were selected to develop a rotational speed range of the carrier from 1264 rpm in one direction (minus 1264 rpm) to 1264 rpm in the other direction (plus 1264 rpm) as the respective input shaft speeds varied from 3700 to 7400 rpm in one case and from 9250 rpm to 2960 in the other case, the directions of rotation of the two input shafts being opposite to each other.

In one particular system in accordance with the present invention, the planetary gear transmission described above was combined with a split power path drive arrangement wherein one of the power paths included a continuously variable transmission (CVT) of the hydraulically controlled, mechanical traction type for improved power and speed control between input and output shafts. In this system, as the input drive shaft varies over a speed range of 2/1, the hydraulically controlled traction CVT is operated to vary relative speeds of the split power paths to maintain the output shaft speed constant. Systems in accordance with the present invention provide the capability of incorporating speed reduction into both power paths in a power split transmission, provide a selected output speed with a minimum number of parts, and permit control of both planetary and carrier rotational speeds. The ring gear normally associated with more conventional differential transmission systems is eliminated. Various alternative options are available to the designer of transmissions in accordance with the invention through the degrees of freedom afforded by the design: namely, the relative sizes of the three sun gears, the option of combining multiple diameters of gears on a single planetary carrier for different gear meshes, the option of driving the output planetary gear set with either of the two input planetary gear sets, and the freedom to use different rotational radii for the different planet gear centers.

BRIEF DESCRIPTION OF THE DRAWING

A better understanding of the present invention may be had from a consideration of the following detailed description, taken in conjunction with the accompanying drawing in which.

DESCRIPTION OF THE PREFERRED EMBODIMENTS

Figure 1:
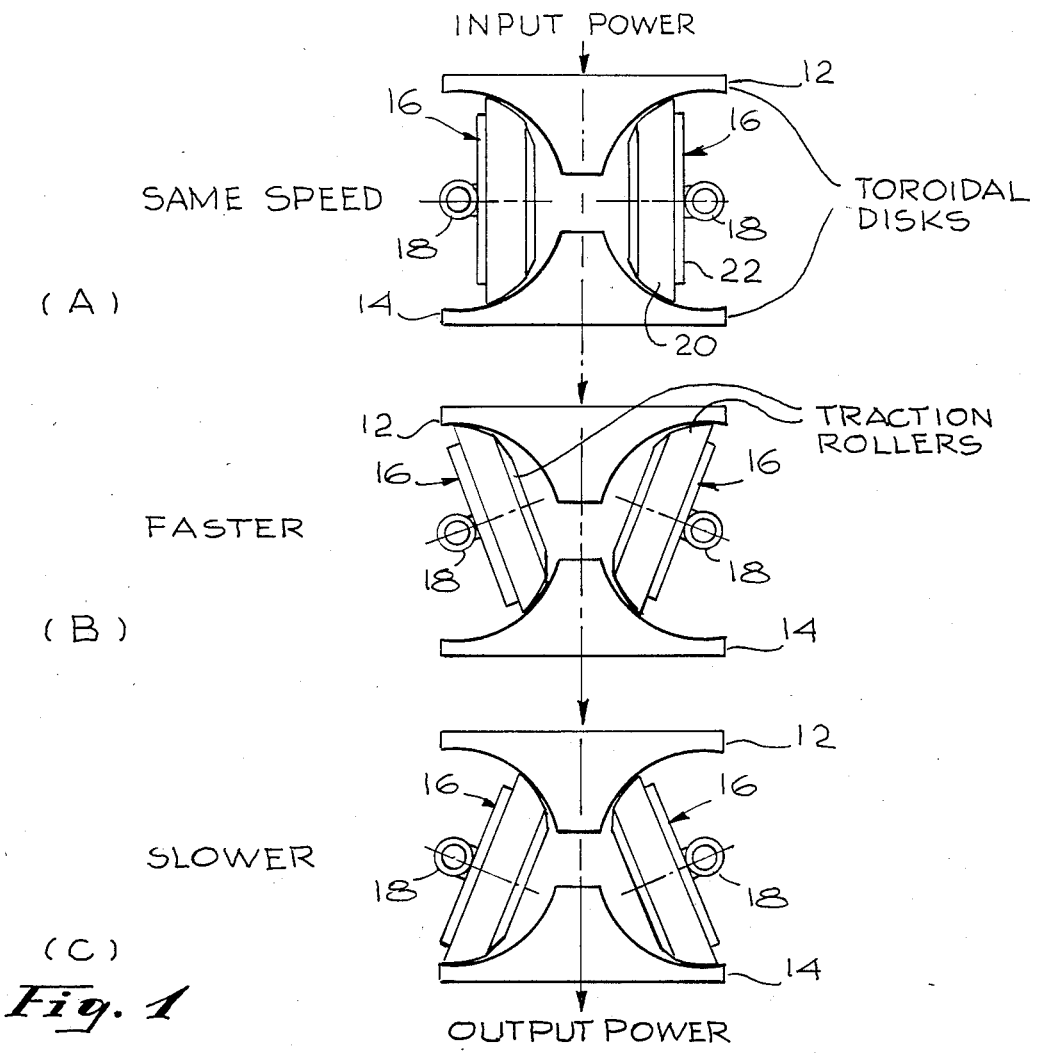
FIG. 1 is a set of three views (A), (B) and (C) representing schematically the operation of a conventional continuously variable traction transmission.

Continuously variable transmissions (CVTs) are well known in the art. The particular type of CVT employed in the preferred embodiment of the present invention comprises a pair of toroidal disks, one driving and the other driven, intercoupled by at least a pair of traction rollers. The basic elements of such an arrangement are shown in the schematic views of FIG. 1 as comprising the drive disk 12, driven disk 14 and a pair of rollers 16, each mounted on a vertically oriented trunnion 18 for rotation about the axes of the trunnions. The disks 12, 14 are toroidally dished to accommodate the angular displacement of the rollers 16 which transfer the rotation of the drive disk 12 to rotation of the driven disk 14 in the reverse direction. The rolling members 20 of the traction rollers 16 are mounted on bearings, as for example ball thrust bearings (not shown), to a stationary backing plate 22 which is affixed to the associated trunnion 18. In the complete assembly, the trunnions 18 are ganged to move together about their axes in response to pressure applied to associated hydraulic cylinders situated at opposite ends of the trunnions. The pressure applied to the cylinders can be developed from any suitable control mechanism, including a servo mechanism coupled to the output of the drive. By such means, the trunnions 18 can be rotated about their axes to vary the angles of the traction rollers and thereby change the speed ratio between the drive disk 12 and the driven disk 14. A complete disclosure of such a traction roller transmission may be found in Kraus et al U.S. Pat. No. 4,086,820, incorporated herein by reference.

In the views of FIG. 1, power flow is in the direction of the arrows; that is, from top to bottom. In FIG. 1(A), the rollers 16 are shown in a neutral or intermediate position with their axes orthogonal to the axes of the toroidal disks 12, 14. In this orientation, the rollers transmit the drive from the drive disk 12 to the driven disk 14 with equal speed of rotation between the two disks, the direction of rotation being reversed.

In FIG. 1(B) the traction rollers 16 are shown oriented with their axes rotated about the axes of the trunnions 18, in a direction toward or facing into the toroidal sections of the drive disk 12. This produces in effect a gear reduction or a speed increase so that the driven disk 14 rotates, in the reverse direction, at a faster rate than the drive disk 12.

FIG. 1(C) shows the traction rollers 16 oriented about the axes of the trunnions 18 to face more toward the driven disk 14. In this orientation, the faces 20 of the rollers 16 move radially inward along the drive disk 12 and radially outward along the driven disk 14, thereby reducing the speed of the driven disk 14 relative to the speed of the drive disk 12.

Figure 2:
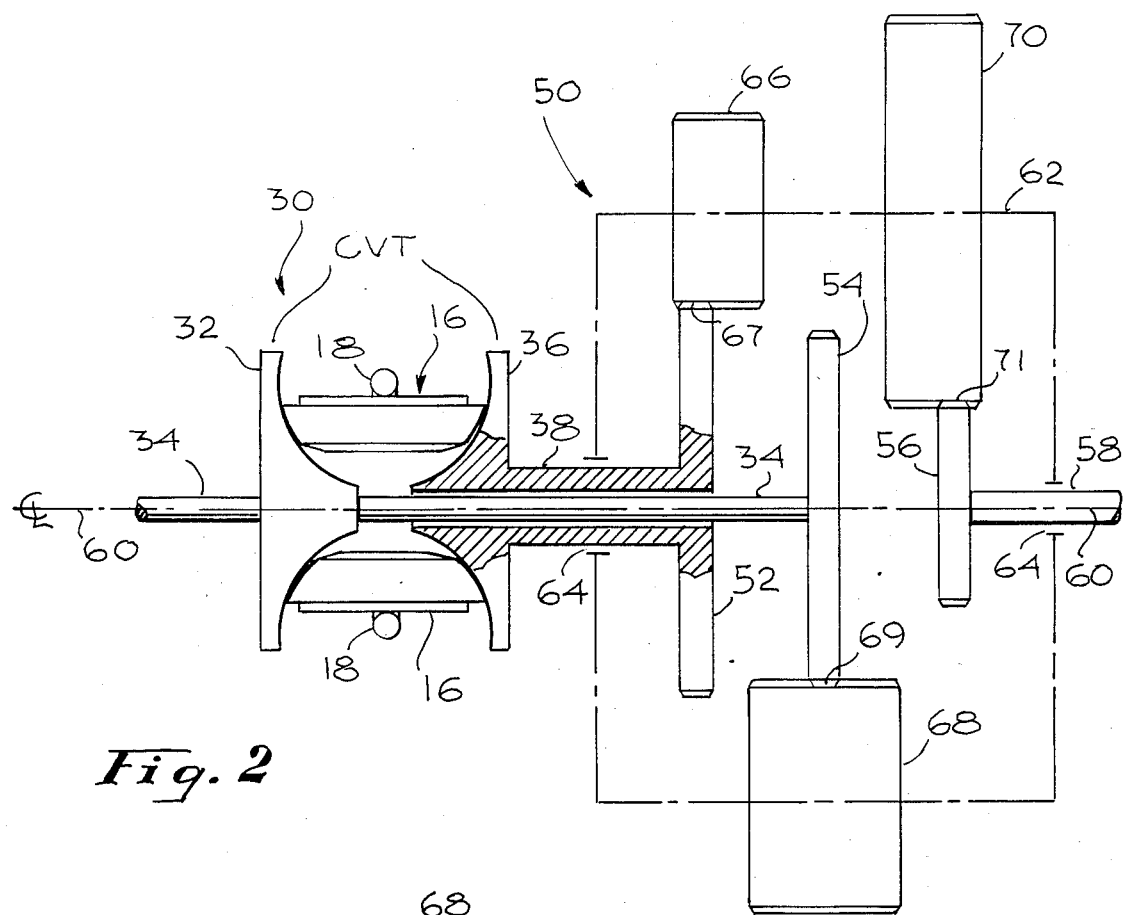
FIG. 2 is a schematic representation, partially broken away, of particular elements utilized in a constant speed transmission of the present invention.

A variant of the CVT of FIG. 1 is schematically represented in FIG. 2 and is shown intercoupled with a planetary transmission of the present invention. The CVT 30 of FIG. 2 is shown comprising an input or drive disk 22 which is integrally mounted on an extended drive shaft 34. The driven or output disk 36 is mounted similarly to the arrangements shown in FIG. 1 and is coupled to be driven from the input disk 32 through the pair of traction rollers 16 which are pivotable about trunnions 18 in the manner already described. The principal difference from the CVT of FIG. 1, however, is that the output disk 36 has a hollow shaft 38 through which the extended drive shaft 34 of the input disk 32 extends. The result is that for the CVT 30 of FIG. 2, split output power paths are provided, one being a direct path along the extension of the input drive shaft 34 and the other being along the output shaft 38 coupled to the output disk 36. Since the traction rollers 36 cause a reversal of rotation between the input and output disks 32, 36, the shaft 38 rotates oppositely to the shaft 34.

When the output shafts 34, 38 are recombined to a common output, as through some known planetary transmission, for example, it becomes possible to vary the speed of the common output shaft by controlling the CVT to vary the speed ratio between the input disk 32 and the output disk 36, at the same time varying the power flow through the respective split paths between the input shaft 34 and the ultimate common output. The advantage of such a combination is that the amount of input power which must be directed through the CVT is reduced, while still permitting the CVT to variably control the output shaft speed relative to the speed of the input shaft. Other considerations, however, referred to above, militate against the use of a split path CVT in combination with a conventional planetary gear transmission for the particular application of the present invention. Accordingly, a new type of planetary gear drive has been developed to achieve control of an output shaft at constant speed through driving from an input shaft which varies in speed over a substantial range, for example over a speed ratio of 2 to 1.

FIG. 2 illustrates such a planetary gear drive 50 in schematic form, shown coupled to the two coaxial output shafts 34, 38 of the CVT 30. It will be recalled that the output shafts 34, 38 rotate in opposite directions with respect to each other. It should be further understood that FIG. 2 is merely a schematic representation of the planetary gear drive 50; not all of the planet gears customarily included in such a drive are shown in FIG. 2—duplicate gears have been omitted from this figure to facilitate the explanation and understanding of the apparatus.

The planetary gear drive 50 of FIG. 2 is equipped with three sun gears: a first sun gear 52 mounted on the outer concentric shaft 38 which becomes a first input shaft to the drive 50, a second sun gear 54 mounted on the central (direct drive) input shaft 34, and a third sun gear 56 mounted on an output shaft 58. In this arrangement, the shafts 34 and 38 provide inputs to the drive 50 and the sun gears 52, 54 are input sun gears rotating in opposite directions with respect to each other. The third sun gear 56 becomes an output sun gear. All three of the sun gears are coaxial, being mounted to rotate about the same center line axis 60. Furthermore, the input shafts 34, 38 are concentric as well as being coaxial.

A planet gear carrier 62 is mounted to rotate about the center line axis 60 on bearings indicated schematically at 64. Mounted for rotation with the carrier are planet gears 66, 68 and 70. The teeth of the first planet gear 66 mesh with teeth on the first sun gear 52, as indicated at 67. The teeth of the second planet gear 68 mesh with teeth on the second sun gear 54, as indicated at 69. The teeth of the third planet gear 70 mesh with teeth on the third sun gear 56, as indicated at 71. In addition, as indicated in FIG. 3, the teeth of the second planet gear 68 mesh with teeth of both the first planet gear 66 and the third planet gear 70, as indicated respectively at 73 and 74.

Figure 3:
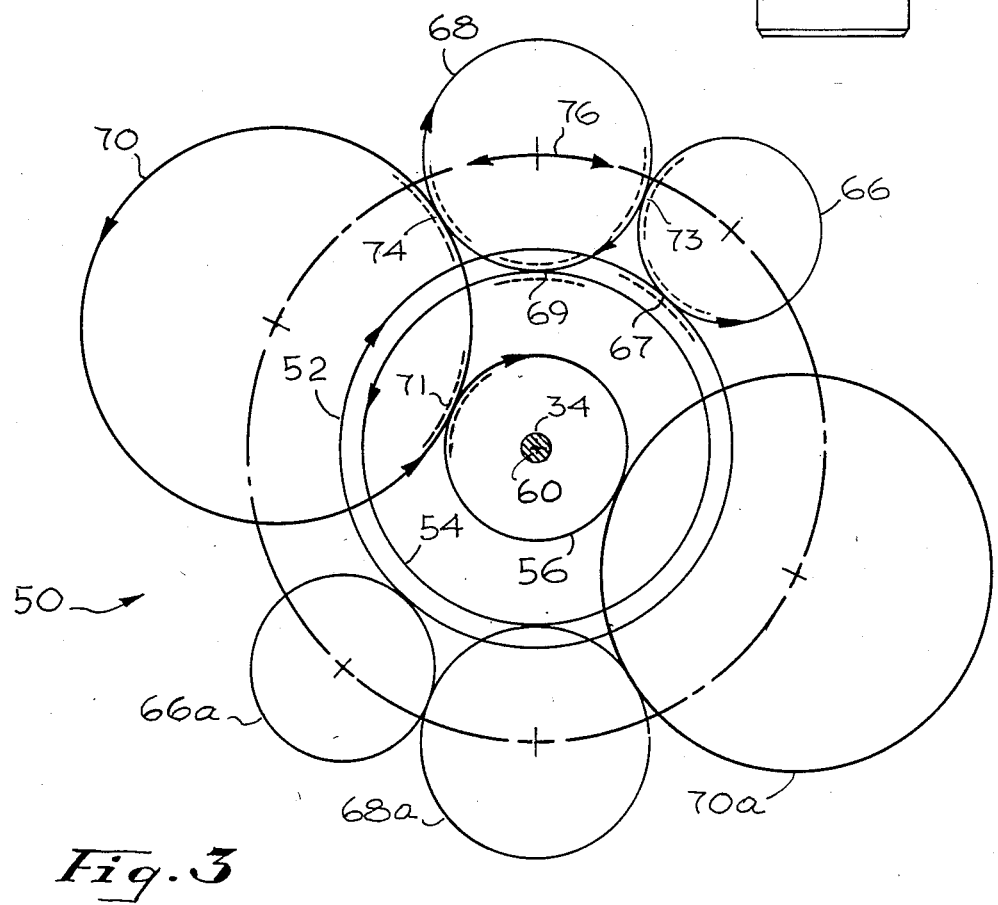
FIG. 3 is a schematic representation of a portion of the arrangement of FIG. 2.

FIG. 3 is a schematic representation of the planet gear drive 50 of FIG. 2 as viewed from the left-hand or power input end. FIG. 3 shows the planetary drive 50 as it would be completed for balanced operation with a second set of planet gears 66a, 68a, and 70a, matching the planet gears 66, 68, 70 by pairs. It will be understood that additional matching planet gears may be included for balancing, if desired, where different gear and carrier dimensions are employed. The carrier 62 is not shown in FIG. 3, but its presence may be inferred by noting that the centers of the respective planet gears fall on a common circle centered on the axis of the shaft 34.

As indicated in FIG. 3, the two input sun gears 52, 54 rotate in opposite directions, the first sun gear 52 being indicated as rotating clockwise while the second sun gear 54 is shown as rotating in a counterclockwise direction. For the arrangement shown, the third, or output, sun gear 56 rotates clockwise, in the same direction as the sun gear 52. Depending upon the relative rotational speeds of the input sun gears 52, 54, the carrier with its planet gears 66, 68, 70 may rotate in either direction, as indicated by the double ended arrow 76.

The planetary gear drive 50 advantageously combines the input power from two oppositely rotating input shafts in a transmission which avoids excessive speed of the planetary gear carrier. In one particular embodiment, in which the radii of the various elements of the planetary gear transmission are as indicated below, the carrier speed varied from minus 1264 rpm (1264 rpm in the counterclockwise direction) to plus 1264 rpm (1264 rpm clockwise) while the input sun gears varied in rotational speed as indicated. The output shaft speed was held constant at 12000 rpm. The rotational speed of the carrier at any instant is generally equal to the algebraic sum of the speeds of the two oppositely rotating sun gears 66, 68 (as modified by a selected constant, which may equal 1.0).

Input speed range: 3700–7400 rpm
CVT output range: 9250–2960 rpm
Radius: sun gear 52—1.125 inches
Radius: sun gear 54—1.18 inches
Radius: sun gear 56—0.545 inches
Radius: planet gear 66—1.125 inches
Radius: planet gear 68—1.07 inches
Radius: planet gear 70—1.675 inches Basic Equations For The Constant Speed Drive (CSD) Planetary Gear Drive The following sets forth the development and application of the design parameters for one preferred embodiment of the invention. For this CSD application, the input speed varies from 3700 to 7400 RPM, while the output speed must remain constant at 12000 RPM.

The traction continuously variable transmission (CVT) has an available overall speed ratio range of about 8 or 9 to 1. For a well balanced design with maximum efficiency, however, a 6.25:1 ratio range has been selected.

For this planetary gear system, the sun 1 speed is therefore based on a CVT drive ratio of 2.5:1 speedup (0.4:1 reduction) at the minimum input speed of 3700 RPM, and at a 2.5:1 reduction at the maximum input speed of 7400 RPM. Initially, a 1:1 speed ratio was set at 75% of the maximum input speed, or 5550 RPM. This 1:1 speed point, as well as the CVT extreme ratio points are also to be considered as variables.

For the basic equations, the following notations apply:

$S_1$ RPM = Sun 1 Speed = CVT Output Speed = 9250 to 2960 RPM
$S_2$ RPM = Sun 2 Speed = CVT Input Speed = 3700 to 7400 RPM
$S_3$ RPM = Sun 3 Speed = Output Speed = 12000 RPM
CRPM = Carrier Speed
$S_1$ = Sun 1 Diameter
$S_2$ = Sun 2 Diameter
$S_3$ = Sun 3 Diameter
$P_1$ = Planet 1 Diameter
$P_2$ = Planet 2 Diameter
$P_3$ = Planet 3 Diameter
The basic equations are:
(1) Planets 1 and 2 are in mesh (equal surface speed):

$$S_1 \text{RPM} \left(\frac{S_1}{P_1}\right) - \text{CRPM}\left(1 + \frac{S_1}{P_1}\right) =$$

-continued
$$S_2RPM\left(\frac{S_2}{P_2}\right) + CRPM\left(1 + \frac{S_2}{P_2}\right)$$

or $$CRPM = \frac{S_1RPM\left(\frac{S_1}{P_1}\right) - S_2RPM\left(\frac{S_2}{P_2}\right)}{\left(2 + \frac{S_1}{P_1} + \frac{S_2}{P_2}\right)}$$

(2) Planets 2 and 3 are in mesh and Planet 3 drives Sun 3:

$$S_3RPM = S_2RPM\left(\frac{S_2}{S_3}\right) + CRPM\left(1 + \frac{S_2}{S_3}\right)$$

Select a zero carrier speed point:

$$S_3RPM = 12000 = S_2RPM\left(\frac{S_2}{S_3}\right) = 5550\left(\frac{S_2}{S_3}\right)$$

$$S_3 = .4625\, S_2$$

Then, from Equa. (2), at $S_2$ RPM=3700, CRPM= +1264.96 and at $S_2$ RPM=7400, CRPM= −264.96

Now let $\left(\frac{S_1}{P_1}\right) = \left(\frac{S_2}{P_2}\right) = X$ from Equa. (1), $$CRPM = \frac{S_1RPM\,(X) - S_2RPM\,(X)}{2 + 2X}$$

For:

| X | $S_2RPM = 3700$ | $S_2RPM = 7400$ | Ratio |
|---|---|---|---|
| 2.25 | CRPM = +1921.2 | CRPM = −1536.9 | 1.25 |
| 2.0 | = +1850 | = −1480 | 1.25 |
| 1.5 | = +1665 | = −1332 | 1.25 |
| 1.25 | = +1541.7 | = −1233.3 | 1.25 |
| 1.0 | = +1387.5 | = −1110 | 1.25 |

Now let $\left(\frac{S_2}{P_2}\right) = Y\left(\frac{S_1}{P_1}\right)$ from Equa. (1)

$$CRPM = \frac{S_1RPM\,(1) - S_2RPM\,(Y)}{3 + Y}$$

For:

| Y | $S_2RPM = 3700$ | $S_2RPM = 7400$ | Ratio |
|---|---|---|---|
| 1.0 | CRPM = +1387.5 | CRPM = −1110 | 1.25 |
| 1.05 | = +1324.7 | = −1187.7 | 1.115 |
| 1.1 | = +1263.4 | = −1263.4 | 1.0 |

Therefore, as an initial solution for these selected speeds and CVT ratios, we have the following gear set, with X=1.0 and Y=1.1:
$S_1$=2.25 inch Diameter
$S_2$=2.36 inch Diameter
$S_3$=1.09 inch Diameter
$P_1$=2.25 inch Diameter
$P_2$=2.14 inch Diameter
$P_3$=as convenient=3.35 inch Diameter These actual diameters must, of course, be adjusted as appropriate to meet gear tooth requirements. The final CVT ratios and/or the X and Y ratios provid adequate leverage to accommodate any reasonable gear tooth adjustments.

The following are therefore the final drive conditions setting forth three different input speeds within the operating range:

| Input Speed = Sun 2 RPM | 3700 | 5550 | 7400 |
|---|---|---|---|
| CVT Ratio (Reduction) | 0.4:1 | 1:1 | 2.5:1 |
| CVT Output Speed = Sun 1 RPM | 9250 | 5550 | 2960 |
| Carrier Speed | +1264 | Zero | −1264 |
| Output Speed = Sun 3 RPM | 12000 | 12000 | 12000 |

Figure 4:
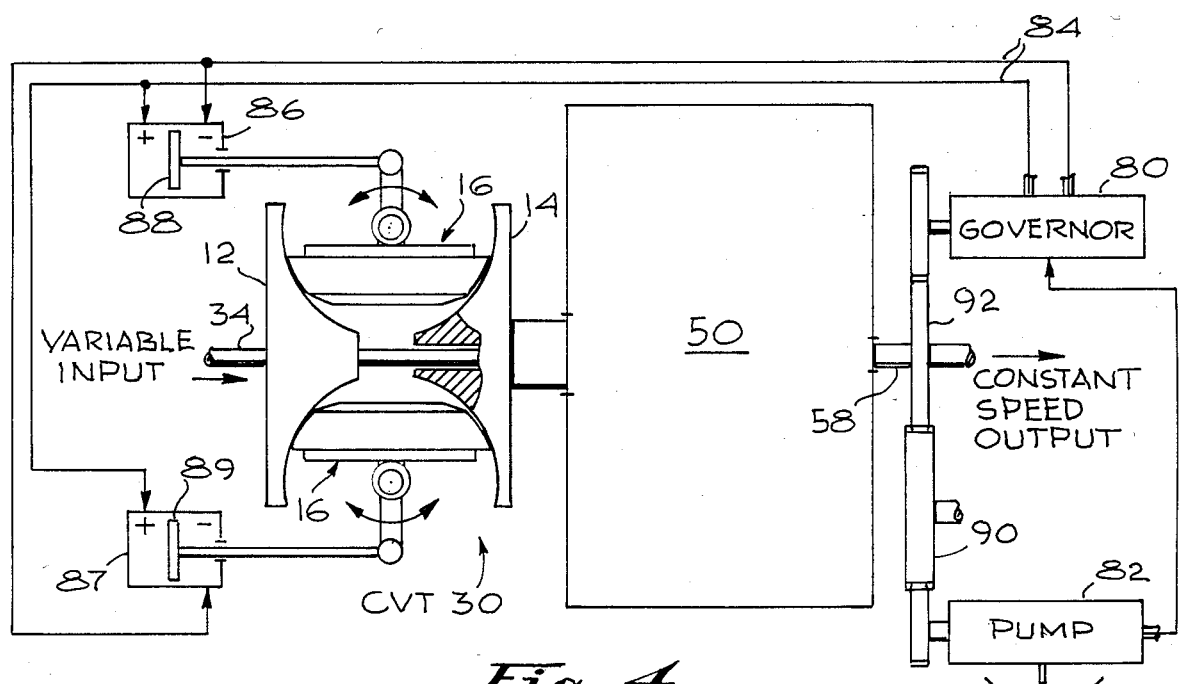
FIG. 4 is a combination block and schematic diagram illustrating a constant speed drive system of the present invention.

FIG. 4 is a schematic representation of an overall system incorporating the CVT 30 and planetary gear drive 50 of FIG. 2 with a feedback arrangement for controlling the CVT to maintain the output speed constant at 12000 rpm. Suitable gearing is mounted to the output shaft 58 to drive an associated flyball governor 80 which controls the pressure from a hydraulic pump 82 to be applied to fluid lines 84 extending to respective cylinders 86, 87 having respective pistons 88, 89 coupled to control the angle of the rollers 16 of the CVT 30, and thereby the speed ratio between the input disk 12 and the output disk 14. The hydraulic pump 82 is shown coupled through a transfer gear set 90 to the drive gear 92 on the output shaft 58.

The flyball governor 80 is set in conventional fashion to control the speed of the output shaft 58 at a constant 12000 rpm. If input shaft speed 34 reduces, thereby tending to reduce the speed of the output shaft 58 below the selected constant value, the flyball governor 80 acts to increase the hydraulic pressure applied to the plus side of the pistons 88, 89 in the cylinders 86, 87. This pressure change causes the pistons to pivot the rollers 16 in the direction of the attitude shown in FIG. 1(B), thus increasing the speed ratio of the CVT 30 and driving the disk 14 at a higher speed to compensate accordingly so that the output shaft 58 is maintained at the selected constant value. If the input shaft 34 increases in speed, the governor 80 acts to apply increased hydraulic pressure behind the pistons 88, 89, thereby pivoting the rollers 16 toward the attitude shown in FIG. 1(C), thus reducing the speed of the driven disk 14 so that the output shaft 58 is maintained at constant speed.

There has thus been described a constant speed drive system in accordance with the present invention, which systems incorporates a novel planetary gear drive, also in accordance with my invention. The apparatus disclosed herein is made up of conventional and well known components. The CVT per se is not a part of this invention, it having been previously disclosed in U.S. Pat. No. 4,086,820, among others. In view of the fact that the elements employed in apparatus of the invention are conventional and well known, the elements have been shown in the accompanying drawings in schematic form. It is considered unnecessary to show particular details of gear teeth, gear mountings, bearings, etc. For example, the planetary gear drive 50 of FIGS. 2 and 3 will be provided with various support bearings for mounting the various gears and the carrier within a suitable housing in a manner well known in the art. The carrier may comprise a single structural element supporting the respective planetary gears as indicated, or it may comprise a pair of symmetrical mating elements joined by keepers or other means. The manner of practicing the invention by constructing apparatus in accordance therewith from the accompanying drawings and written description contained herein should be obvious to anyone of ordinary skill in the art.

Although there have been described above specific arrangements of an improved constant speed drive system in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. A constant speed drive system for providing power to an output shaft at substantially constant speed from an input shaft operable at variable speed over a predetermined range comprising:
    a continuously variable transmission having an input shaft rotatable at variable speeds within a predetermined range and capable of splitting input power into two distinct power paths, a first path transmitting power along a first shaft rotatable at variable speed with said input shaft, the second power path including a second shaft which is concentrically mounted surrounding said first shaft and is rotatable at a speed which is variable with respect to the input shaft in accordance with the setting of the continuously variable transmission, and means for varying the speed ratio between the input shaft and said second shaft, said second shaft being driven to rotate in a direction opposite to the rotation of the first shaft;
    a dual input planetary gear drive having an output shaft, a planetary gear carrier having first and second planet gear sets engaging first and second sun gears which are secured to the first and second shafts of the continuously variable transmission, and a third sun gear secured to said output shaft and engaging a third planet gear set secured to the gear carrier to drive the output shaft from said first and second shafts;
    means for monitoring the rotational speed of the output shaft; and
    means responsive to said monitoring means and coupled to the continuously variable transmission to vary the speed ratio thereof so as to compensate for changes in speed of the input shaft and thereby maintain the speed of the output shaft substantially constant at a preselected value.

2. The apparatus of claim 1 wherein the continuously variable transmission comprises a pair of toroidal disks, one being a drive disk and the other being a driven disk, and at least a pair of traction rollers mounted between the disks for driving the driven disk from the drive disk at a selectively variable speed of rotation relative to, and in a direction opposite to, that of the drive disk.

3. The apparatus of claim 2 wherein the continuously variable transmission includes a first shaft extending from the drive disk concentrically through the driven disk and a second shaft connected to the driven disk and surrounding the first shaft.

4. The apparatus of claim 1 wherein the means for controlling the speed ratio of the continuously variable transmission comprises a pair of hydraulic cylinders having pistons coupled respectively to the traction rollers to vary the angles of said rollers concurrently.

5. The apparatus of claim 4 further including a hydraulic pump coupled to be driven by said output shaft for applying pressurized fluid to said monitoring means.

6. The apparatus of claim 5 wherein the monitoring means comprises a governor coupled to the output shaft and operable to differentially control the fluid pressure applied to the hydraulic cylinder in accordance with speed variations sensed at said output shaft.

7. A constant speed drive system for providing power to an output shaft at substantially constant speed from an input shaft operable at variable speed over a predetermined range comprising:
    a continuously variable transmission having an input shaft rotatable at variable speeds within a predetermined range and capable of splitting input power into two distinct power paths, a first path transmitting power along a first shaft rotatable at variable speed with said input shaft, the second power path including a second shaft which is rotatable at a speed which is variable with respect to the input shaft in accordance with the setting of the continuously variable transmission, and means for varying the speed ratio between the input shaft and said second shaft, said second shaft being driven to rotate in a direction opposite to the rotation of the first shaft;
    a dual input planetary gear drive having an output shaft and being coupled to the first and second shafts of the continuously variable transmission to drive the output shaft therefrom;
    means for monitoring the rotational speed of the output shaft; and
    means responsive to said monitoring means and coupled to the continously variable transmission to vary the speed ratio thereof so as to compensate for changes in speed of the input shaft and thereby maintain the speed of the output shaft substantially constant at a preselected value;
    wherein said planetary gear drive includes first and second sun gears respectively mounted on the first and second shafts of the continuously variable transmission, a third sun gear mounted on said output shaft along a common axis with the first and second sun gears, and a plurality of planet gears mounted on a carrier for rotation about said common axis, three of said planet gears being intermeshed with respective ones of said three sun gears.

8. The apparatus of claim 7 wherein the intermediate one of said three planet gears is intermeshed directly with the two planet gears adjacent thereto.

9. The apparatus of claim 8 wherein the planetary gear drive is devoid of a ring gear.

10. The apparatus of claim 9 wherein the carrier is driven to develop a speed of rotation about said axis equal to the algebric sum of the speeds of rotation of the first and second shafts.

11. The apparatus of claim 7 wherein the first and second sun gears are driven to rotate in opposite directions, and wherein the carrier is driven by the intermeshing of the planet gears which are intermeshed with the first and second sun gears.

12. A constant speed drive system for providing power to an output shaft at substantially constant speed from an input shaft operable at variable speed over a predetermined range comprising:

a continously variable transmission having an input shaft rotatable at variable speeds within a predetermined range and capable of splitting input power into two distinct power paths, a first path transmitting power along a first shaft rotatable at variable speed with said input shaft, the second power path including a second shaft which is concentrically mounted surrounding said first shaft and is rotatable at a speed which is variable with respect to the input shaft in accordance with the setting of the continuously variable transmission, and means for varying the speed ratio between the input shaft and said second shaft, said second shaft being driven to rotate in a direction opposite to the rotation of the first shaft;

a dual input planetary gear drive having an output shaft and a plurality of planet gear sets engaging first and second sun gears which are secured to the first and second shafts of the continuously variable transmission and a third sun gear secured to said output shaft, respectively, to drive the output shaft therefrom, said planet gear sets being mounted on a planetary gear carrier which is rotatably driven only by the planet gear sets engaging said first and second sun gears;

means for monitoring the rotational speed of the output shaft; and means responsive to said monitoring means and coupled to the continuously variable transmission to vary the speed ratio thereof so as to compensate for changes in speed of the input shaft and thereby maintain the speed of the output shaft substantially constant at a preselected value.

13. A constant speed drive system for providing power to an output shaft at substantially constant speed from an input shaft operable at variable speed over a predetermined range comprising:

a continuously variable transmission having an input shaft rotatable at variable speeds within a predetermined range and capable of splitting input power into two distinct power paths, a first path transmitting power along a first shaft rotatable at variable speed with said input shaft, the second power path including a second shaft which is concentrically mounted surrounding said first shaft and is rotatable at a speed which is variable with respect to the input shaft in accordance with the setting of the continuously variable transmission, and means for varying the speed ratio between the input shaft and said second shaft, said second shaft being driven to rotate in a direction opposite to the rotation of the first shaft;

a dual input planetary gear drive having an output shaft and a plurality of planet gear sets coupled respectively to the first and second shafts of the continously variable transmission and to said output shaft to drive the output shaft therefrom, the planet gear set which is coupled to one of said first and second shafts being respectively intermeshed with both the planet gear set coupled to the other of said first and second shafts and the planet gear set coupled to the output shaft;

means for monitoring the rotational speed of the output shaft; and means responsive to said monitoring means and coupled to the continously variable transmission to vary the speed ratio thereof so as to compensate for changes in speed of the input shaft and thereby maintain the speed of the output shaft substantially constant at a preselected value.

14. The constant speed drive system of claim 13 further comprising a planetary gear carrier rotatably supporting the respective planet gear sets, said planetary gear carrier being mounted for rotation in response to the intermeshed planet gear sets which are coupled to the first and second shafts rotating about the common axis of said first and second shafts.

15. A planetary gear drive for receiving power from the two input shafts and developing output power along a single output shaft in accordance with the combined input power comprising:

first and second rotatable input shafts;

first and second input sun gears mounted respectively on said first and second input shafts;

a planetary gear carrier mounted for rotation about an axis common to the first and second shafts and separately therefrom;

at least three planet gears rotatably mounted on said carrier and selectively intermeshed with each other, two of said planet gears being respectively meshed with the first and second sun gears; and a third rotatable shaft for developing output power and having a third sun gear mounted thereon, the third sun gear being meshed with the third one of said planet gears.

16. A constant speed drive system comprising the planetary gear drive of claim 1 and further including, in combination, a continuously variable transmission having an input shaft rotatable at variable speeds within a predetermined range and capable of splitting input power into two distinct power paths, a first path transmitting power to said first rotatable input shaft of the planetary gear drive, the second power path transmitting power to said second rotatable shaft of the planetary gear drive, and means for varying the speed ratio of the continuously variable transmission in accordance with sensed changes in speed of the third rotatable shaft.

17. The apparatus of claim 15 wherein each of the first, second and third shafts is aligned along said axis.

18. The apparatus of claim 17 wherein the first and second input shafts are concentric with respect to each other.

19. The apparatus of claim 15 wherein the first and second input shafts are mounted to be rotated in opposite directions with respect to each other and wherein the planetary gear drive develops a rotational speed of the carrier equal to the algebraic sum of the speeds of the input shafts.

20. The apparatus of claim 13 wherein the input shafts and associated sun gears are driven to rotate in opposite directions, and wherein the carrier is driven by the intermeshing of those planet gears which are meshed with the first and second sun gears.

21. The apparatus of claim 15 wherein the planet gear intermeshed with the first sun gear is also intermeshed with the other two of the three planet gears.

22. The apparatus of claim 15 wherein the at least three planet gears comprise three pairs of planet gears mounted in a balanced relationship, the gears of each pair being identical to each other and mounted in 180° opposed positions about the carrier, the three pairs of gears being arrayed in two sets of mutually opposed gears with both sets of gears being intermeshed with each other and with the first and second sun gears in like fashion.

23. The apparatus of claim 15 wherein said planetary gear drive is devoid of a ring gear.

24. The method of driving an output shaft by combining power from a pair of input shafts comprising the steps of:
    mounting a plurality of planet gears on a carrier mounted to rotate about an axis common to all three of said shafts;
    coupling a first planet gear to a first sun gear mounted on a first one of said input shafts;
    coupling a second planet gear to a second sun gear mounted on a second one of said input shafts;
    coupling a third planet gear to a third sun gear mounted on the output shaft;
    intercoupling the first, second and third planet gears together in a gear train; and
    for forcing rotation of the carrier in response to relative rotations of the first and second sun gears.

25. The method of claim 24 further including the step of driving said carrier without reliance on a ring gear.

26. The method of claim 24 further including the step of driving said carrier by the intermeshing of the first and second planet gears.

27. The method of claim 24 further including the step of installing the first shaft to be concentric with and to rotate about the second shaft.

28. The method of claim 24 including the step of driving the two input shafts to rotate in opposite directions.

29. The method of coupling a pair of input shafts to an output shaft to develop power at the output shaft as a combination of power applied to the two input shafts comprising the steps of:
    mounting a first shaft concentrically and coaxially with a second shaft for rotation thereabout in a direction opposite to the direction of rotation of the second shaft;
    mounting a carrier for rotation about said shafts;
    mounting a plurality of planet gears on said carrier for rotation therewith and for rotation relative to the carrier;
    coupling a first one of said planet gears to a first one of said shafts in driving relationship therewith;
    coupling a second planet gear to a second one of said shafts in driving relationship therewith;
    coupling a third planet gear to the output shaft in driving relationship therewith; and
    coupling the second planet gear in driving relationship between adjacent first and third planet gears to transmit power from the first and second shafts to the output shaft.

30. The method of claim 29 further including the step of driving the carrier at a rotational speed equal to the algebraic sum of the rotational speeds of the first and second shafts.

31. The method of claim 29 further including the step of driving the carrier by the intermeshing of the first and second planet gears.

32. The method of claim 29 further including the steps of coupling a split path, continuously variable transmission having a pair of concentric output shafts to said first and second shafts to drive said first and second shafts in opposite rotational directions with the rotational speed ratio between the shafts being selectively variable by the continuously variable transmission;
    monitoring the rotational speed of the output shafts; and
    controlling the continuously variable transmission to selectively vary the speed ratio in response to deviations in speed of the output shaft from a selected constant value.

* * * * *